No. 760,107. PATENTED MAY 17, 1904.
S. K. DENNIS.
TONGUE TRUCK FOR HARVESTERS.
APPLICATION FILED FEB. 8, 1904.
NO MODEL.
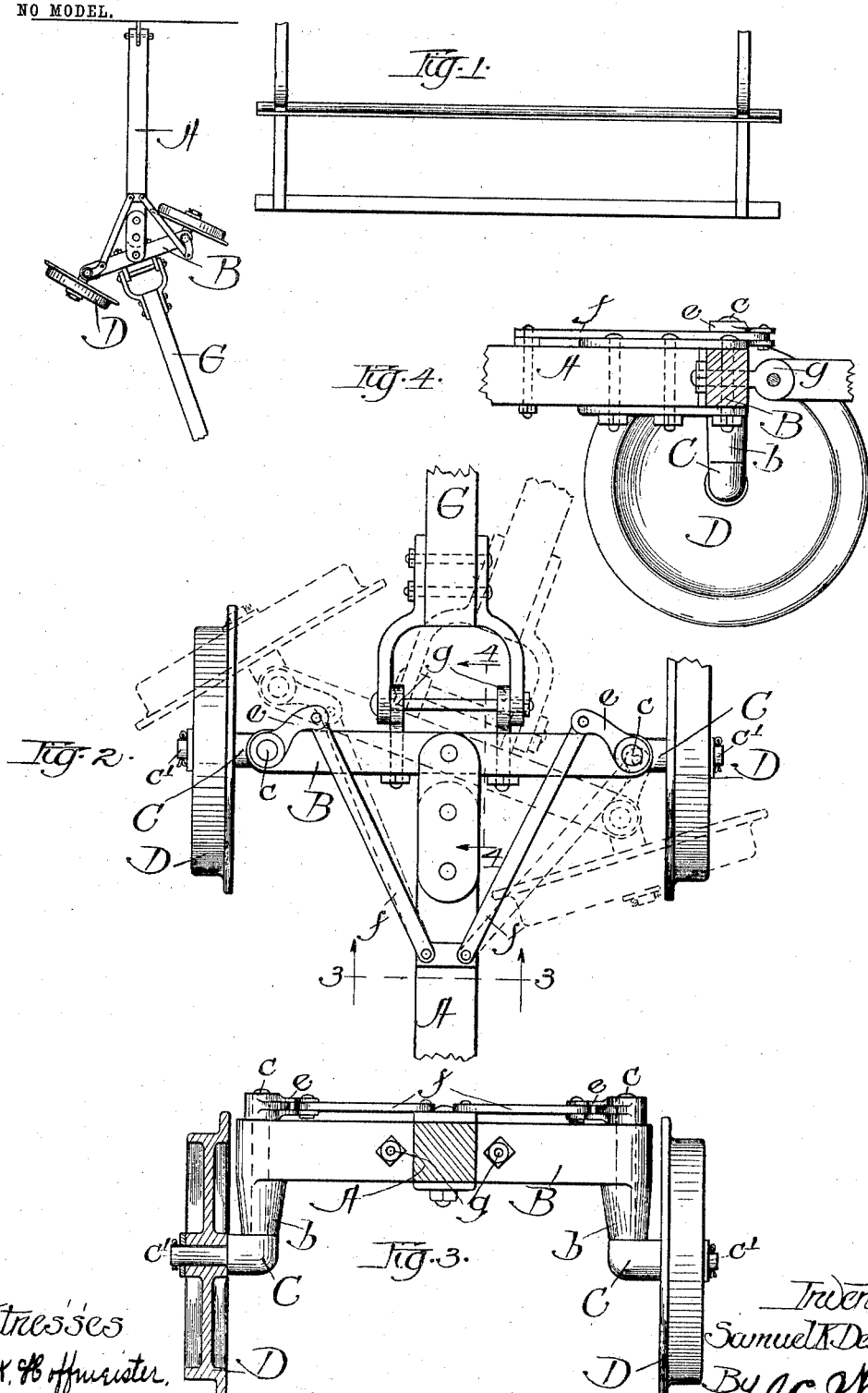
Witnesses
J. K. Hoffmeister
J. N. Daggett
Inventor:
Samuel K. Dennis
By J. C. Norris
Attorney No. 760,107.　　　　　　　　　　　　　　　　　　　　　　　　Patented May 17, 1904.

UNITED STATES PATENT OFFICE.

SAMUEL K. DENNIS, OF CHICAGO, ILLINOIS, ASSIGNOR TO INTERNATIONAL HARVESTER COMPANY, A CORPORATION OF NEW JERSEY.

TONGUE-TRUCK FOR HARVESTERS.

SPECIFICATION forming part of Letters Patent No. 760,107, dated May 17, 1904.

Application filed February 8, 1904. Serial No. 192,641. (No model.)

*To all whom it may concern:*

Be it known that I, SAMUEL K. DENNIS, a citizen of the United States, residing at Chicago, in the county of Cook and State of Illinois, have invented a new and useful Improvement in Tongue-Trucks for Harvesters, of which the following is a complete specification.

This invention relates to that style of harvester tongue-trucks in which the guiding-tongue is caused to produce a greater angular deflection of the planes of the supporting-wheels of the truck than the tongue itself is subjected to.

The purpose of this invention is to produce a tongue-truck in which the guiding-tongue thereof shall operate through suitable connecting means to produce greater angular deflection of the planes of the truck-wheels than the angular deflection of the tongue and at the same time permit of free movement of the tongue in a vertical plane without effecting the movement of the truck-wheels.

Referring to the drawings, Figure 1 is a plan view showing the tongue-truck complete and a fragment of the reel of a harvester in their approximate relative positions. Fig. 2 is an enlarged plan view of the truck, only a portion of the stub and the guiding-tongues being shown, however, and the relative position of the several parts when turning being shown in dotted lines. Fig. 3 is a transverse section of the truck as indicated by the line 3 3 of Fig. 2, with one wheel shown in section. Fig. 4 is a partial longitudinal section of the truck as indicated by the line 4 4 of Fig. 2.

In the drawings, A designates the stub-tongue of the tongue-truck, and B the axle, pivotally connected thereto. On either end of the axle B are the downwardly-projecting bosses $b$, provided with apertures which engage the vertically-extending stems $c$ of the truck-wheel bearings C. These truck-wheel bearings C are provided with a horizontally-extending member $c'$, on which journal the truck-wheels D. On the projecting ends of the stems $c$ of the wheel-bearings C above the axle B are secured the arms $e$. Connecting the free ends of these arms $e$ with the stub-tongue A are the links $f$.

G is the tongue for guiding the truck, pivotally connected to the axle B, the pivotal connection being effected by means of the eye-bolts $g$, thus making the tongue rigid laterally with respect to the said axle B, but permitting it to move freely in a vertical plane.

It will be seen that as the tongue G is deflected or moved laterally the axle B and the truck-wheel bearings mounted thereon will move with it, and the links $f$ $f$ will restrain the movement of the free end of the arms $e$, which will cause the said bearings C to move about the spindle $c$ of the wheel-bearing C, deflecting the truck-wheels D an amount depending upon the extent of movement of the said tongue and also upon the length of the arms $e$. In this way the truck-wheels will be subjected to a greater angular deflection than the angular deflection of the tongue G, and the lines of the axis of the truck-wheels will thus be brought to pass through or near the correct pivotal center about which the harvester to which the trucks are attached is turning.

What I claim as my invention, and desire to secure by Letters Patent, is—

1. In a tongue-truck for harvesters, in combination, a horizontally-swinging axle pivotally connected to the frame of the truck, a guiding-tongue pivotally secured thereto, truck-wheel supports having vertically-disposed pivotal bearings on either end of said swinging axle, truck-wheels journaled on said supports, and means interposed between the truck-wheel supports and a fixed part of the truck-frame for controlling the position and movement of the truck-wheels, substantially as described.

2. In a tongue-truck for harvesters, in combination, a horizontally-swinging axle pivotally connected to the frame of the truck, truck-wheels journaled thereon, a guiding-tongue pivotally secured to said axle and means pivotally secured to a fixed part of the frame of said truck for controlling the movement and position of said truck-wheels, said means being rendered operative by the lateral movement of the guiding-tongue, substantially as described.

3. In a tongue-truck for harvesters, in combination, a horizontally-swinging axle pivotally connected to the frame of said truck, a guiding-tongue pivotally secured thereto, truck-wheel supports having vertically-disposed pivotal bearings on either end of said swinging axle, truck-wheels journaled on said support, arms rigidly secured to the vertically-disposed pivotal bearings and links connecting the free ends of said arms to a fixed part of the frame of said truck, substantially as described.

SAMUEL K. DENNIS.

Witnesses:
   J. F. STEWARD,
   ALEX. MOXEY.